(12) United States Patent
Takahashi et al.

(10) Patent No.: US 12,132,430 B2
(45) Date of Patent: Oct. 29, 2024

(54) ROTATING MACHINE DRIVE SYSTEM AND VEHICLE

(71) Applicant: Hitachi Astemo, Ltd., Hitachinaka (JP)

(72) Inventors: Akeshi Takahashi, Tokyo (JP); Kazuo Nishihama, Tokyo (JP); Noriyuki Maekawa, Hitachinaka (JP); Katsuhiro Hoshino, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 416 days.

(21) Appl. No.: 17/773,908

(22) PCT Filed: Sep. 8, 2020

(86) PCT No.: PCT/JP2020/033879
§ 371 (c)(1),
(2) Date: May 3, 2022

(87) PCT Pub. No.: WO2021/065369
PCT Pub. Date: Apr. 8, 2021

(65) Prior Publication Data
US 2022/0416709 A1    Dec. 29, 2022

(30) Foreign Application Priority Data

Oct. 4, 2019  (JP) ................................. 2019-183773

(51) Int. Cl.
*H02K 3/28* (2006.01)
*H02K 11/33* (2016.01)
*H02P 27/08* (2006.01)

(52) U.S. Cl.
CPC ............... *H02P 27/08* (2013.01); *H02K 3/28* (2013.01); *H02K 11/33* (2016.01)

(58) Field of Classification Search
CPC ............ H02K 3/28; H02K 3/38; H02K 7/006; H02K 7/06; H02K 7/063; H02K 7/08;
(Continued)

(56) References Cited

U.S. PATENT DOCUMENTS 10,218,236 B2 *  2/2019  Kowalski .................. H02K 3/28
11,716,039 B2 *  8/2023  Astemo .................... H02K 7/20
(Continued)

FOREIGN PATENT DOCUMENTS

EP    3 018 687 A2    5/2016
JP    61-43831 A      3/1986
(Continued)

OTHER PUBLICATIONS

WO2019026125A1-Translation (Year: 2024).*
(Continued)

*Primary Examiner* — Naishadh N Desai
*Assistant Examiner* — Ahmed F Seck
(74) *Attorney, Agent, or Firm* — Crowell & Moring LLP

(57) ABSTRACT

The present invention addresses the problem of providing a rotating machine drive system comprising a winding switching device, wherein the rotating machine drive system has a relatively simple configuration, allows wear of electrical contacts during switching and sliding to be minimized, and is highly reliable. The present invention is characterized in comprising a rotating machine having a plurality of windings, an inverter device for operating the rotating machine at variable speed, and a winding switching device for switching connection of the plurality of windings; the winding switching device having winding terminals, a semi-moving element having a short-circuit part that faces the winding terminals and also having a sliding part provided with first protrusions on the surface thereof opposite from the surface having the short-circuit part, and a moving element facing the sliding part of the semi-moving element and having a sliding part provided with second protrusions on the surface facing the sliding part of the semi-moving element; the moving element being made to slide relative to the semi-moving element, whereby the connection between the wind-
(Continued)

ing terminals and the short-circuit part is changed and the connection of the plurality of windings is switched.

12 Claims, 12 Drawing Sheets

(58) Field of Classification Search
CPC .... H02K 7/081; H02K 7/1166; H02K 7/1185; H02K 7/12; H02K 7/16; H02K 11/049; H02K 11/20; H02K 11/28; H02K 11/30; H02K 11/33; H02K 13/00; H02K 15/0056; H02K 15/0062; H02K 15/0068; H02K 19/12; H02K 19/14; H02K 19/26; H02K 19/36; H02K 23/02; H02K 23/023; H02K 23/026; H02K 23/10; H02K 23/14; H02K 23/38; H02K 27/06; H02K 27/10; H02K 27/20; H02K 29/14; H02K 2203/06; H02K 2203/09; H02P 1/04; H02P 1/08; H02P 1/10; H02P 3/06; H02P 3/065; H02P 3/08; H02P 3/12; H02P 3/18; H02P 3/22; H02P 6/06; H02P 6/08; H02P 6/17; H02P 7/025; H02P 7/20; H02P 7/22; H02P 7/24; H02P 7/28; H02P 11/00; H02P 11/04; H02P 11/06; H02P 25/22; H02P 25/18; H02P 25/16; H02P 27/026; H02P 27/048; H02P 27/05; H02P 27/06; H02P 27/08; H02P 27/16; H02P 29/024; H02P 29/10; H02P 29/20; H02P 2103/00; H02P 2103/10; H02P 2103/20; H02P 2209/01; H02P 2209/03; H02P 2209/05; H02P 2201/03
See application file for complete search history.

(56) References Cited

U.S. PATENT DOCUMENTS

| 2021/0044238 | A1 | 2/2021 | Takahashi et al. | |
| 2022/0224270 | A1* | 7/2022 | Sugimoto | H02K 3/28 |

FOREIGN PATENT DOCUMENTS

| JP | 2009-278841 | A | | 11/2009 | |
| JP | 2009278841 | | * | 11/2009 | H02K 3/28 |
| JP | 2017-70112 | A | | 4/2017 | |
| JP | WO2019026125 | A1 | * | 2/2019 | H02P 25/18 |
| JP | 2019-154163 | A | | 9/2019 | |
| WO | WO 2018/213919 | A1 | | 11/2018 | |

OTHER PUBLICATIONS

JP2009278841-Translation (Year: 2024).*
Extended European Search Report issued in European Application No. 20872927.7 dated Sep. 19, 2023 (9 pages).
International Search Report (PCT/ISA/210) issued in PCT Application No. PCT/JP2020/033879 dated Nov. 2, 2020 with English translation (four (4) pages).
Japanese-language Written Opinion (PCT/ISA/237) issued in PCT Application No. PCT/JP2020/033879 dated Nov. 2, 2020 with English translation (six (6) pages).

* cited by examiner

FIG. 2A
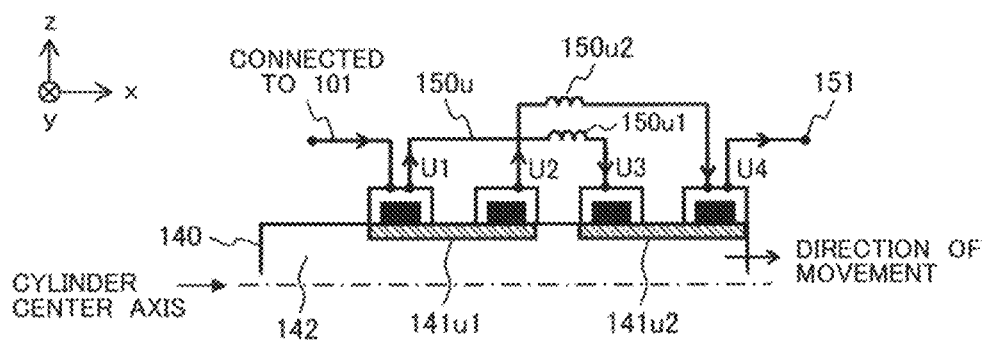
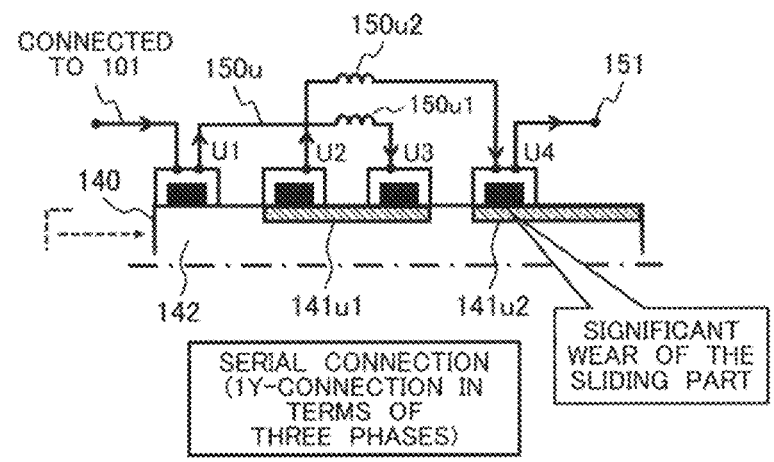

2Y-CONNECTION

DURING SWITCHING

1Y-CONNECTION

FIG. 4

| | CONVENTIONAL TECHNOLOGY | | PRESENT INVENTION |
|---|---|---|---|
| PRESSING FORCE AT A CONTACT PORTION | STRONG | WEAK | STRONG |
| ELECTRICAL RESISTANCE | ○ LOW | × HIGH | ○ LOW |
| MECHANICAL LIFE | × SHORT | △ SLIGHTLY LONG | ○ LONG |
| ACTUATOR POWER | × LARGE | △ SLIGHTLY SMALL | ○ SMALL |

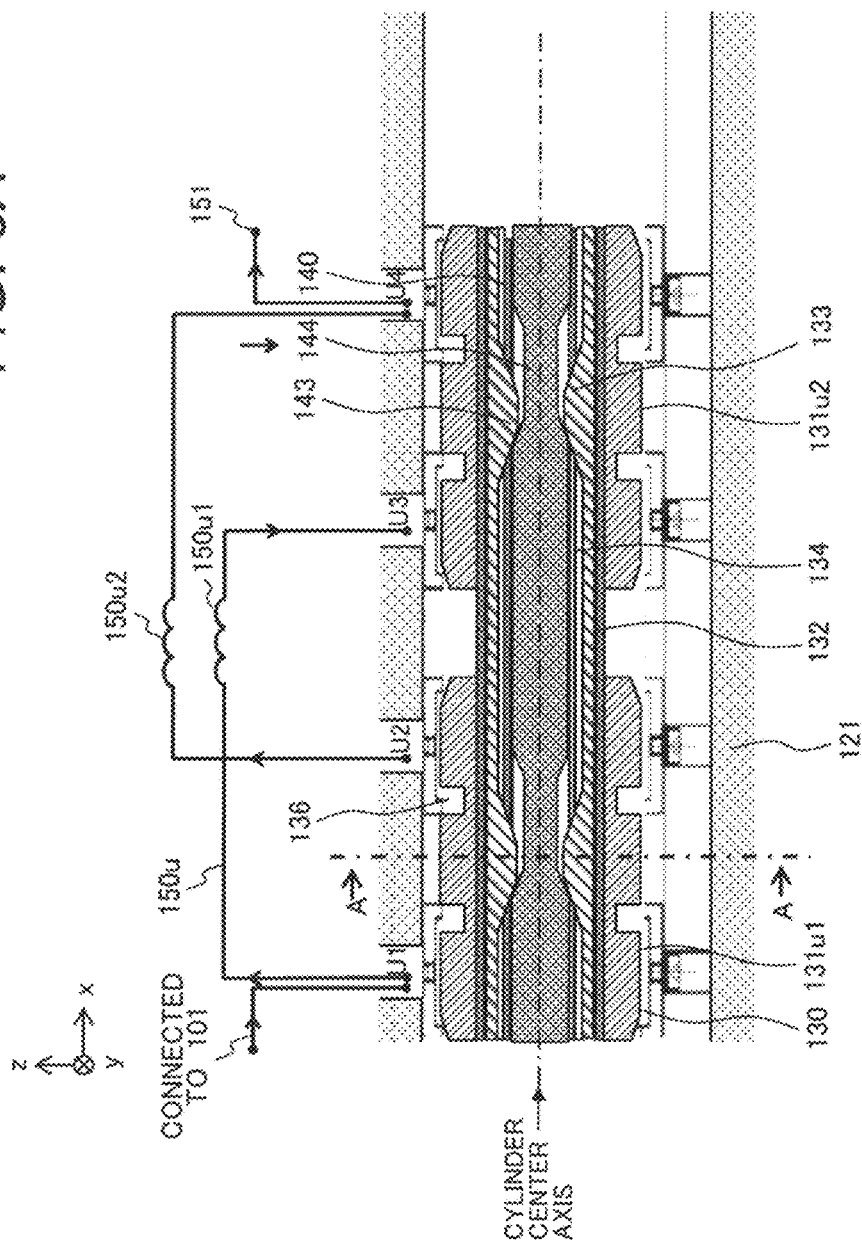
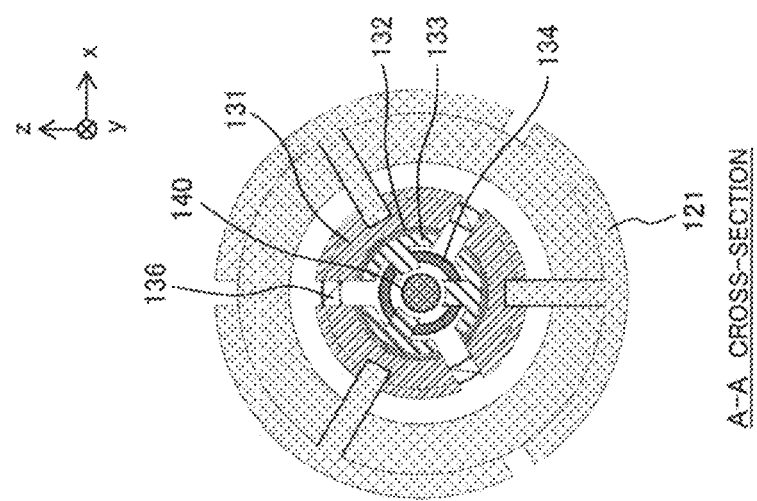
FIG. 5A

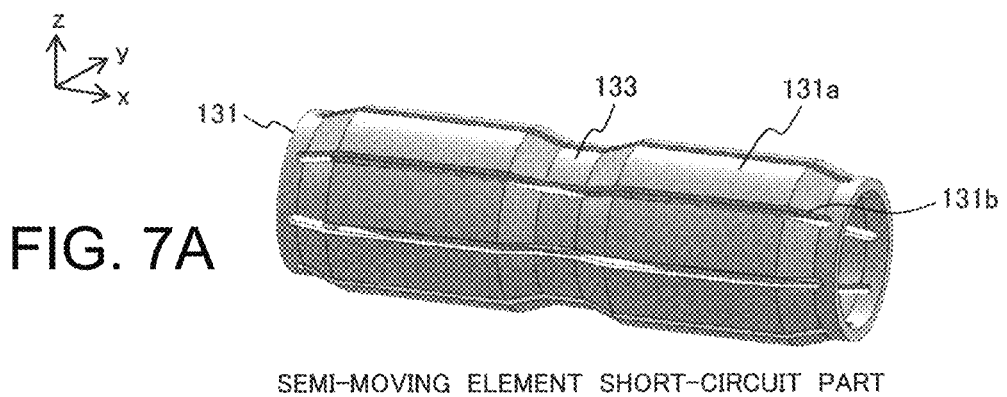
FIG. 7A   SEMI-MOVING ELEMENT SHORT-CIRCUIT PART
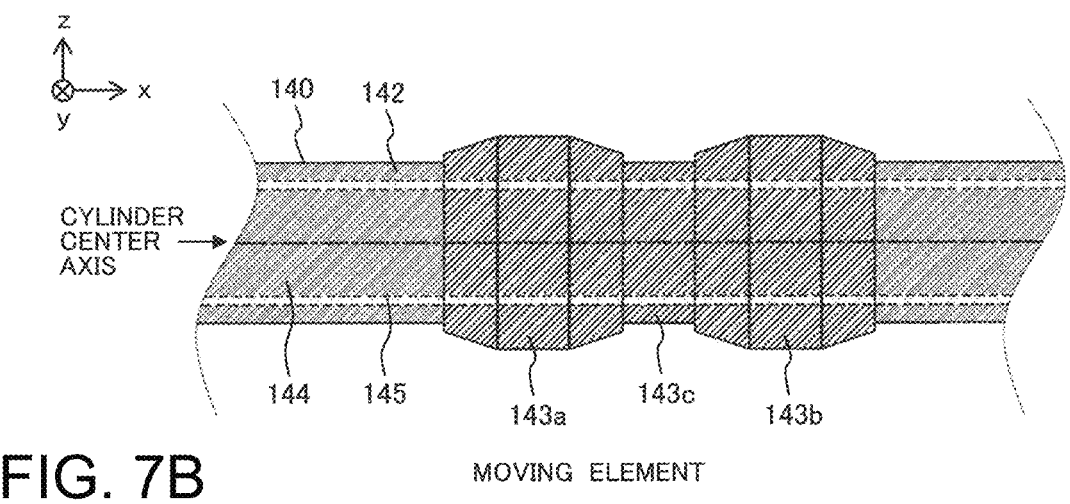
FIG. 7B   MOVING ELEMENT

ROTATING MACHINE DRIVE SYSTEM AND VEHICLE

TECHNICAL FIELD

The present invention relates to the structure of a rotating machine drive system for driving and controlling a rotating machine such as motors etc., and specifically relates to a technology effectively applicable to a rotating machine drive system provided with a winding switching device.

BACKGROUND ART

The efficiency of a rotating machine operated by an inverter device at variable speed is generally expressed by an efficiency curve obtained by changing the number of revolutions under constant load conditions, and the efficiency peaks in a certain rotation zone within a required rotation range. To achieve energy-saving of equipment, it is important to improve the efficiency curve in a wide range of rotation and reduce power loss of the rotating machine.

It is well known that, although the efficiency of a rotating machine decreases in a low-speed rotation zone, by providing a rotating machine with high inductance at the design phase, it is possible to reduce not only the current value itself but also harmonic components. This makes it possible to increase the efficiency in a low-speed rotation zone. However, the efficiency decreases in a high-speed rotation zone.

To solve this problem, there is a technology as disclosed in patent literature 1 wherein connections of stator windings are switched between the low-speed rotation zone and the high-speed rotation zone. When connections are switched during driving of the rotating machine, an arc occurs at the switching contact, causing the life of the contact to decrease. Patent literature 1 discloses a technology wherein a winding switching device comprises a compression coil (spring) and electrodes to avoid the occurrence of a contact arc.

CITATION LIST

Patent Literature

Patent literature 1: JP-A 2017-070112
Patent literature 2: JP-A S61-43831

SUMMARY OF INVENTION

Technical Problem

Rotating machines mounted on automobiles, railroad vehicles, etc. need to have high power density to achieve light weight, and they meet this requirement by applying high current to generate high torque. When applying a winding switching device to such high-current uses, it is necessary to maintain a pressing force at the switching contact by means of a spring mechanism etc. so as to apply high current all the time. Accordingly, conventional switching devices became large.

Meanwhile, patent literature 1 discloses a structure wherein a plurality of movable bodies with different short-circuit wiring patterns are provided with respect to a contact of the winding terminal so as to operate the movable bodies to switch connections. However, in the disclosed structure, short-circuit wiring intersects in a complicated manner, making the fabrication difficult. Furthermore, to withstand high current, it is necessary to construct short-circuit wiring by use of a bus bar having a large conductor area. However, bus bar bending work and assembly are complicated resulting in a significant cost increase.

There is another way to construct a switching device using a relay; however, the size of the relay device increases as current becomes high, resulting in a cost increase. Also, there is a method of operating and sliding the short-circuit wiring or short-circuit board of the winding terminal. However, repeated switching operation will wear both parts, resulting in a short mechanical life. Furthermore, great actuator power is required to withstand sliding friction.

As a solution, it is possible to reduce wear and the actuator power by reducing the pressing force at the contact portion. In this case, however, electrical resistance at the contact portion increases, generating more heat at the contact portion and resulting in a decrease in the system efficiency. Therefore, in conventional switching devices, how to achieve a long life is another challenge.

In a winding switching device disclosed in patent literature 2, a link mechanism is used to ensure a pressing force at the switching contact, avoid the sliding, and reduce wear. However, because a repulsion force of the spring works in the direction of pressing the contact during switching operation, great actuator power is required. Since a link mechanism is also necessary, the switching device becomes large, making it difficult to achieve a small size.

Therefore, an objective of the present invention is to provide a rotating machine drive system provided with a winding switching device wherein the rotating machine drive system has a relatively simple structure and is capable of reliably preventing wear at the electrical contact during switching and sliding and a vehicle using the rotating machine drive system.

Solution to Problem

To solve the above problem, the present invention provides a rotating machine drive system comprising a rotating machine having a plurality of windings, an inverter device for operating the rotating machine at variable speed, and a winding switching device for switching connections of the plurality of windings. The winding switching device comprises winding terminals, a semi-moving element having a short-circuit part that faces the winding terminals and also having a sliding part provided with first protrusions on the surface opposite from the surface having the short-circuit part, and a moving element facing the sliding part of the semi-moving element and having a sliding part provided with second protrusions on the surface facing the sliding part of the semi-moving element. The moving element is made to slide relative to the semi-moving element, thereby changing the connection between the winding terminals and the short-circuit part and switching the connections of the plurality of windings.

Furthermore, the present invention provides a vehicle comprising a rotating electrical machine, a battery, and a power conversion device for converting direct-current power from the battery to alternating-current power and supplies the alternating-current power to the rotating electrical machine, wherein torque of the rotating electrical machine is transmitted to wheels via a transmission and the rotating electrical machine is provided with a rotating machine drive system characterized as stated above.

Advantages Effects of Invention

According to the present invention, it is possible to achieve a rotating machine drive system provided with a winding switching device, the rotating machine drive system having a relatively simple structure and capable of reliably preventing wear at the electrical contact during switching and sliding, and a vehicle using the rotating machine drive system.

This makes it possible to contribute to the reduction of the size of the rotating machine drive system and the vehicle, reduction of costs, and increase in reliability (long life).

Problems, structures, and advantageous effects other than the above will be clearly explained in the preferred embodiments described below.

BRIEF DESCRIPTION OF DRAWINGS

FIG. 2A shows the structure of a winding switching device according to a conventional technology.

FIG. 4 shows the comparison of advantages and disadvantages between the present invention and conventional technologies.

FIG. 5A shows the operation of the 1Y/2Y switching device for one phase according to example 2 of the present invention.

FIGS. 7A and 7B show a semi-moving element and a moving element of the 1Y/2Y switching device according to example 3 of the present invention.

DESCRIPTION OF EMBODIMENTS

Hereinafter, examples of the present invention will be described with reference to the drawings. In each drawing, the same sign is provided for the same structure and detailed description of overlapping parts will be omitted.

Description will be given below about the number of parallel connections in several different patterns. However, the present invention is not limited to such a structure and can apply to a structure wherein Y-connections with the different number of parallel connections are switched, a structure wherein the number of parallel connections of the Δ connection are switched, and a structure wherein the Y-connection and the Δ connection are switched.

Furthermore, the winding switching device has a cylindrical structure; however, it may be a planar structure or other structures. The rotating machine may be an induction machine, or a permanent magnet synchronous machine, winding-type synchronous machine, synchronous reluctance rotating machine, etc. The stator winding method may be concentrated winding or distributed winding. Also, the number of phases of the stator winding is not limited to those shown in the examples.

Furthermore, semiconductor switching elements of the inverter device are IGBTs (Insulated Gate Bipolar Transistors). However, the present invention is not limited to those, and they may be MOSFETs (Metal Oxide Semiconductor Field-Effect Transistors) or other power semiconductor devices.

Furthermore, the rotating machine control method is a vector control that does not use a speed detector or voltage detector. However, a control method that uses a speed detector or a voltage detector may be used.

Example 1

Figure 1:
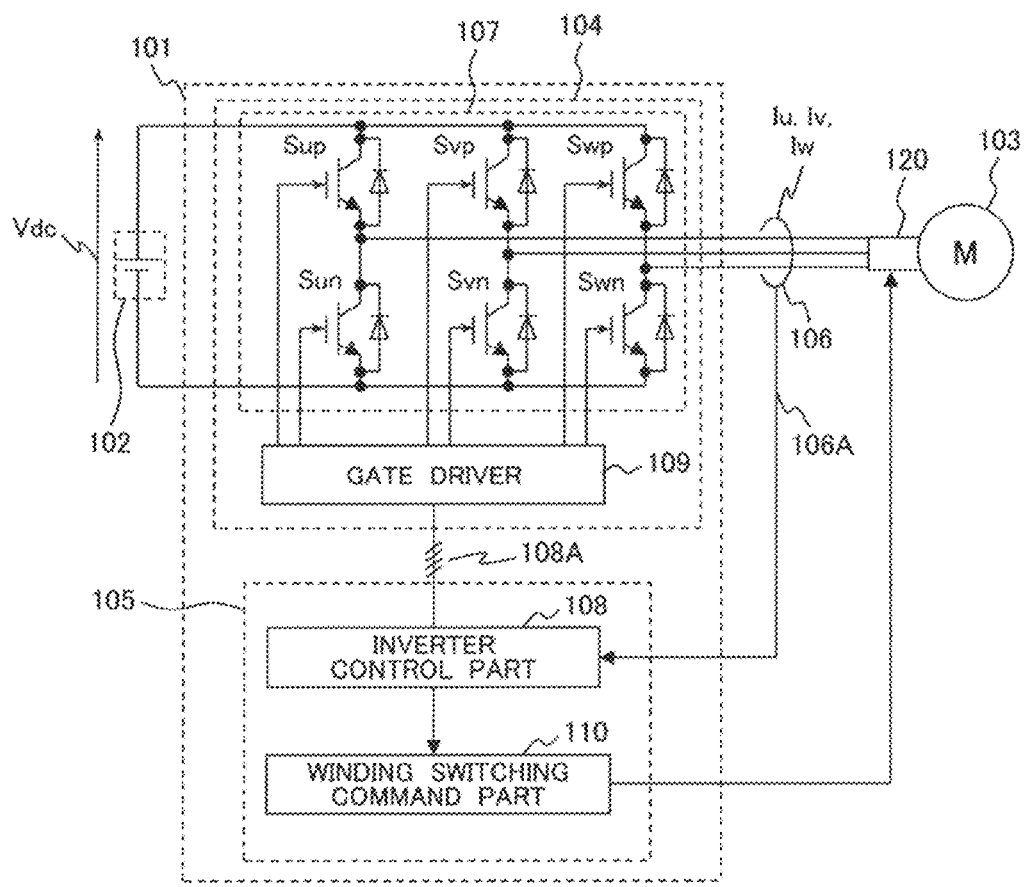
FIG. 1 is a block diagram showing the overall structure of a rotating machine drive system according to example 1 of the present invention.
Figure 2B:
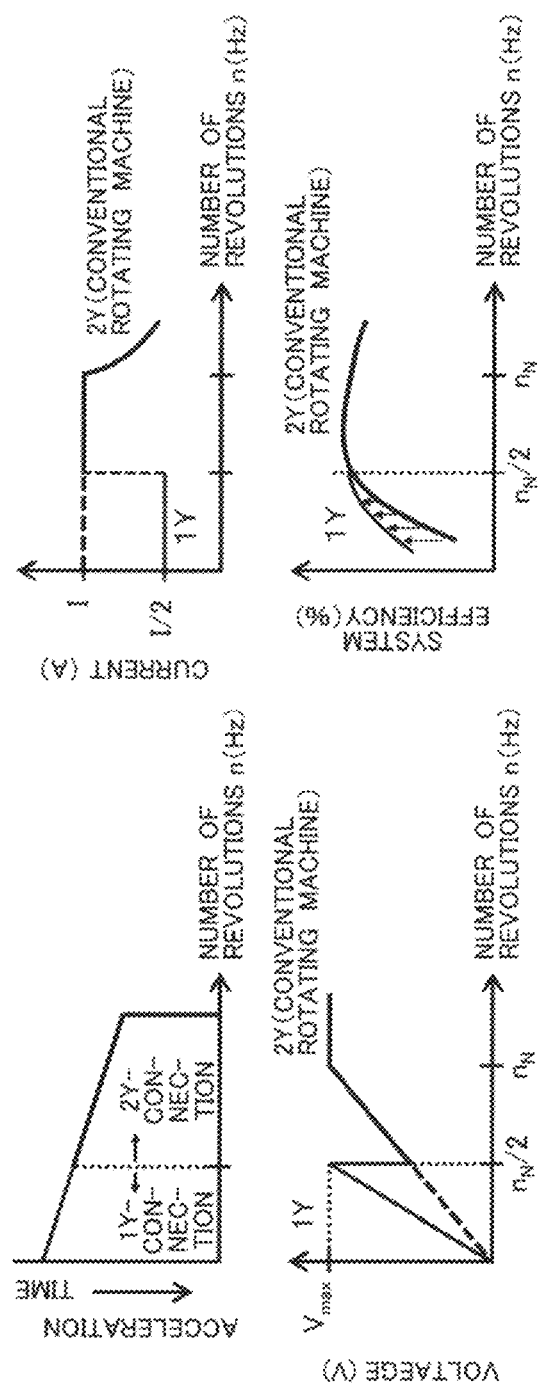
FIG. 2B shows the characteristics of the rotating machine using the winding switching according to a conventional technology.
Figure 3A:
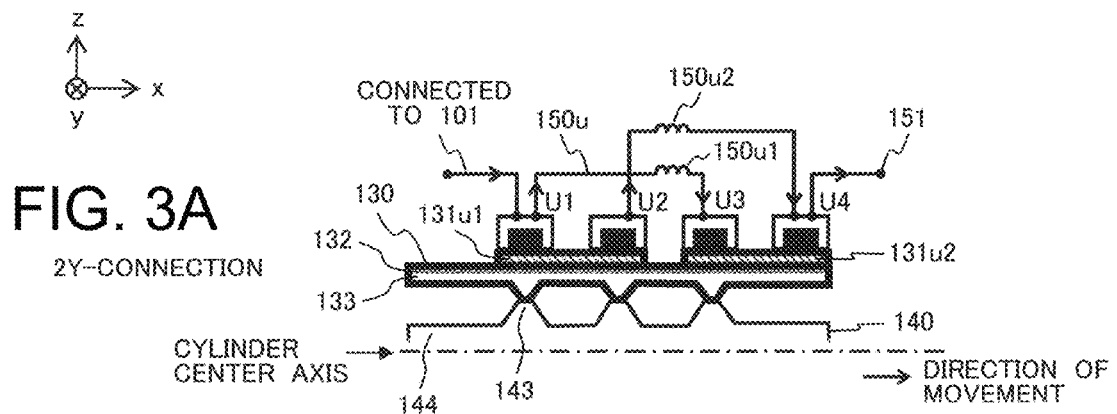
FIGS. 3A to 3C show the operation of the 1Y/2Y switching device for one phase according to example 1 of the present invention.
Figure 3B:
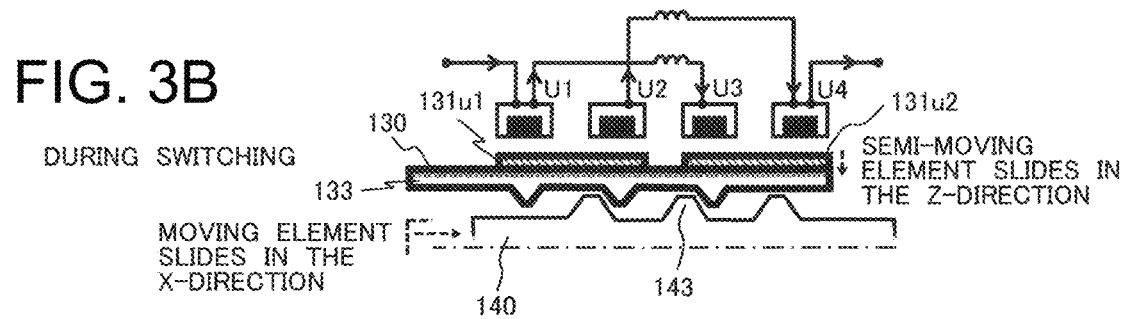
Figure 3C:
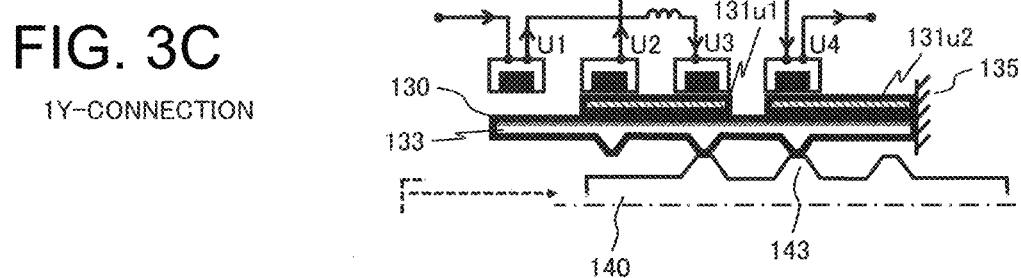

Hereinafter, a first example of the present invention will be described with reference to FIG. 1 through FIG. 4. FIG. 1 is a block diagram showing the overall structure of a rotating machine drive system according to example 1. FIG. 2A shows the structure of a winding switching device according to a conventional technology, and FIG. 2B shows the characteristics of the rotating machine according to a conventional technology. FIG. 3 shows the operation of the 1Y/2Y switching device for one phase according to example 1. FIG. 4 shows the comparison of advantages and disadvantages between the present invention and conventional technologies.

The overall structure of the rotating machine drive system according to example 1 will be described with reference to FIG. 1. In FIG. 1, an inverter device 101 comprises an inverter circuit 104 for converting direct-current power, which is output from a direct-current power source 102, to alternating-current power and outputting the alternating-current power to a rotating machine 103; a phase current detection circuit 106 for detecting current running through the rotating machine 103 connected to the inverter circuit 104; and a control device 105 for performing inverter control (power conversion control) of the inverter circuit 104 based on the phase current information 106A detected by the phase current detection circuit 106 and using an applied voltage command pulse signal 108A, thereby operating the rotating machine 103 at variable speed.

The phase current detection circuit 106, composed of a hall CT (Current Transformer) etc., detects three-phase current waveforms Iu, Iv, Iw of U-phase, V-phase, and W-phase current. However, all three-phase current does not have to be detected by the phase current detection circuit 106: any two-phase current is detected and the other one phase current may be calculated based on the assumption that three-phase current is in an equilibrium status.

The inverter circuit 104 comprises an inverter main circuit 107 composed of a plurality of semiconductor switching elements, such as IGBTs, diodes (free-wheeling diodes), etc., and a gate driver 109 for generating a gate signal to the IGBTs of the inverter main circuit 107 based on the applied voltage command pulse signal 108A sent from the inverter control part 108.

The rotating machine 103, for example, composed of an induction machine having a plurality of windings or a permanent magnet synchronous machine, is designed so that the starting end and the end of a winding are pulled out and stored in the winding switching device 120 so that connections of the windings can be switched.

The winding switching device 120 has a circuit capable of switching connections of the windings of the rotating machine 103 and switches winding connections based on the signal output from the winding switching command part 110 when the rotation of the rotating machine 103 changes between the low-speed rotation zone and the high-speed rotation zone.

The control device 105 comprises an inverter control part 108 for generating an applied voltage command pulse signal 108A based on the phase current information 106A detected by the phase current detection circuit 106, and a winding switching command part 110 for sending a connection switching signal to the winding switching device 120.

In this example, the rotating machine drive system at least includes an inverter device 101, a rotating machine 103, and a winding switching device 120.

Next, the structure of the winding switching device will be described with reference to FIG. 2A through FIG. 4. Also, explanation will be given about the problems with conventional technologies, their solutions, and the principle of reducing the size of the winding switching device and increasing its service life, which is an objective of the present invention.

FIG. 2A is a schematic diagram showing the structure of the U-phase winding 150*u* of the stator of the rotating machine 103, wherein starting ends (terminals) U1 and U2 and ends (terminals) U3 and U4 of two U-phase windings 150*u*1 and 150*u*2 are pulled out so as to switch the serial and parallel connections. The structure of the V-phase winding and the W-phase winding is the same and therefore, description is omitted. As shown in the upper drawing of FIG. 2A, starting end U1 and starting end U2, and end U3 and end U4 of the U-phase winding 150*u* are connected in parallel by short-circuit parts 141*u*1 and 141*u*2, respectively; parallel connections are also implemented in the V-phase and W-phase windings; and the three-phase neutral point 151 is connected in the Y letter shape. This configuration is referred to as "2Y-connection".

On the other hand, the configuration shown in the lower drawing of FIG. 2A is referred to as "1Y-connection", wherein end U3 of the U-phase winding 150*u*1 and starting end U2 of the U-phase winding 150*u*2 are connected in serial by the short-circuit part 141*u*1; serial connections are also implemented in the V-phase and W-phase windings; and the three-phase neutral point 151 is connected in the Y letter shape.

It is well known that system efficiency can be increased by use of the above-mentioned winding switching device so as to switch between 1Y-connection and 2Y-connection according to the number of revolutions n of the rotating machine 103, as shown in FIG. 2B. Specifically, when the number of revolutions is small, increasing voltage by means of 1Y-connection will reduce current by half comparing the value with the conventional technology. As a result, conduction loss and switching loss of the semiconductor switching elements constituting the inverter circuit 104 decrease by half. Thus, the inverter efficiency and the system efficiency increase significantly, resulting in that energy saving can be achieved.

However, in the structure shown in FIG. 2A, winding terminals U1 to U4 and the short-circuit part 141 slide, and repeated switching operation will wear both of them, causing a mechanical life to become shortened. Also, actuator power is required to be large to withstand sliding friction.

As a solution, reducing the pressing force at the contact portion will reduce wear and the actuator power; however, electrical resistance at the contact portion will increase, generating more heat at the contact portion and decreasing the system efficiency. Therefore, in the conventional technology, achieving a long life is a challenge.

Another method is to use a relay to configure a switching device. However, as current becomes higher, the size of the relay device increases, resulting in a cost increase. Another method is to use a link mechanism, as shown in patent literature 2, so as to ensure a pressing force at the switching contact, avoid the sliding, and reduce wear. However, great actuator power is required because a repulsion force of the spring works in the direction of pressing the contact during switching operation. Since a link mechanism is necessary, the switching device becomes large, and it is difficult to achieve a small size.

The above problems can be solved by adopting the winding switching device shown in FIG. 3. Detailed description will be given about specific solutions and the principle of reducing the size of the winding switching device and increasing its service life, which is an objective of the present invention.

FIG. 3 shows the operation of the 1Y/2Y switching device for one phase (U-phase) according to the first example of the present invention. Hereinafter, as shown in FIG. 3, the structure of the switching contact in this example will be described using the XYZ coordinate system wherein the horizontal direction is defined as an X-axis, the depth direction of the plane of paper is defined as a Y-axis, and the vertical direction is defined as a Z-axis.

The structure of the winding switching device shown in FIG. 3 is different from the conventional structure (FIG. 2A) in the point that a semi-moving element 130 is disposed between the winding terminals U1 to U4 and the moving element 140. The semi-moving element 130 comprises a short-circuit part 131 (131*u*1, 131*u*2), an insulating part 132, and a sliding part 133, and the moving element 140 is composed of a rod 144 provided with a sliding part 143.

As shown in FIG. 3(*a*), starting end U1 and starting end U2, and end U3 and end U4 of the U-phase winding 150*u* are connected in parallel by short-circuit parts 131*u*1 and 131*u*2, respectively, thereby establishing a 2Y-connection. Herein, the protrusions downward in the Z direction of the semi-moving element sliding part 133 and the protrusions upward in the Z direction of the moving element sliding part 143 face to each other.

As shown in FIG. 3(*b*), during switching, the moving element 140 slides in the X direction, releasing the opposed state of the protrusions of the semi-moving element sliding part 133 and the protrusions of the moving element sliding part 143, thereby causing the semi-moving element 130 to slide in the Z direction. This movement eliminates the mechanical contact between the winding terminals U1 to U4 and the short-circuit part 131 (131*u*1, 131*u*2).

When the moving element 140 further slides in the X direction, as shown in FIG. 3(*b*), the semi-moving element 130 slides in the X direction along with the moving element 140 while the side surface of the protrusions of the semi-moving element sliding part 133 come in contact with the side surface of the protrusions of the moving element sliding part 143.

Then, as shown in FIG. 3(*c*), when the semi-moving element 130 reaches the stopper 135, only the moving element 140 keeps sliding in the X direction and stops at the time the protrusions of the semi-moving element sliding part 133 and the protrusions of the moving element sliding part 143 have faced to each other.

By this movement, end U3 of the U-phase winding 150u1 and starting end U2 of the U-phase winding 150u2 are connected in serial by the short-circuit part 131u1, thereby establishing a 1Y-connection.

The above-mentioned structure eliminates the sliding between the winding terminals U1 to U4 and the short-circuit part 131. Accordingly, wear of both the winding terminals and the short-circuit part due to repeated switching operation can be avoided, resulting in a long mechanical life. Furthermore, since sliding friction is generated only at the contact portion between the semi-moving element sliding part 133 and the moving element sliding part 143, by making the sliding part composed of material having a small friction coefficient, it is possible to achieve both the X-direction movement of the moving element 140 and the Z-direction movement of the semi-moving element even with small actuator power. As a result, it is possible to simultaneously achieve a small winding switching device and its long life.

Furthermore, when the protrusions of the semi-moving element sliding part 133 and the protrusions of the moving element sliding part 143 face to each other, a sufficient pressing force can be generated between the winding terminals U1 to U4 and the short-circuit part 131. Thus, it is possible to suppress electrical resistance at the contact portion while avoiding the decrease in life due to sliding friction. Furthermore, since the semi-moving element 130 and the moving element 140 are made of simple cylindrical parts, unlike the link mechanism, increase in the number of parts or the size can be avoided. Thus, it is possible to provide a small winding switching device even in applications where large current will flow.

The semi-moving element short-circuit parts 131u1 and 131u2 are composed of cylindrical conductors. Both of them function to switch connection patterns of the terminals U1 to U4 and therefore need to be electrically insulated from each other. Therefore, in FIG. 3, a predetermined insulation distance is provided between the short-circuit parts 131u1 and 131u2 in the X direction.

Moreover, it is desirable that material with low electrical resistance, such as brass and plated metal material, be used for the semi-moving element short-circuit parts 131u1 and 131u2.

Material for the semi-moving element sliding part 133 may be metal or resin, but metal is more desirable in terms of ensuring long-time durability. Also, it is desirable that material with a low friction coefficient and high degree of hardness be used. When using metal for making the semi-moving element sliding part 133, a semi-moving element insulating part 132 needs to be provided so that electrical short-circuits will not occur between the semi-moving element short-circuit parts 131u1 and 131u2 via the semi-moving element sliding part 133.

The insulating part 132 may be composed of a cylindrical collar or a sheet-like insulator wrapping around the sliding part 133, or may be constructed so that an insulator is pasted on the inner periphery side of the short-circuit part 131 and then assembled onto the sliding part 133. If the sliding part 133 is made of non-conductive material such as resin, an insulating part 132 does not need to be provided.

It is preferable that lubricant be applied to the portion where the semi-moving element sliding part 133 and the moving element sliding part 143 mechanically come into contact with each other or be filled into a space between the two sliding parts so as to reduce the friction coefficient during sliding. By doing so, actuator power can be small, so that a further smaller winding switching device can be achieved.

When using a grease as a lubricant, grease will adsorb abrasion powder generated at the sliding parts, so it is possible to avoid problems of a scuff at the sliding parts or electrical short-circuits caused by abrasion powder scattering in the terminals.

If using a structure where the inner periphery side is sealed with the semi-moving element sliding part 133, lubricating oil can be filled. In this case, abrasion powder can be confined in the enclosed space and it is therefore possible to eliminate a problem of electrical short-circuits.

Thus, by providing a semi-moving element 130, the electrical short-circuit function can be separated from the mechanically sliding function. As a result, taking measures for achieving a long life becomes easier.

The moving element rod 140 may be driven by a direct acting type linear actuator or by a drive mechanism using ball screws. Also applicable is a structure where the moving element sliding part 143 is a helical structure swirling around the X-axis, the semi-moving element sliding part 133 is also a helical structure swirling around the X-axis, and the moving element rod 140 is rotated by a rotary actuator, thereby changing the opposed state of both sliding parts as shown in FIG. 3.

In other words, a rotating machine drive system according to this example comprises a rotating machine 103 having a plurality of windings, an inverter device 101 for operating the rotating machine 103 at variable speed, and a winding switching device 120 for switching connections of the plurality of windings of the rotating machine 103. The winding switching device 120 comprises winding terminals U1 to U4, a semi-moving element 130 having a short-circuit part 131 that faces the winding terminals U1 to U4 and also having a sliding part 133 provided with first protrusions on the surface opposite from the surface having the short-circuit part 131, and a moving element 140 facing the semi-moving element sliding part 133 and having a sliding part 143 provided with second protrusions on the surface facing the semi-moving element sliding part 133. The moving element 140 is made to slide relative to the semi-moving element 130, thereby changing the connections between the winding terminals U1 to U4 and the semi-moving element short-circuit part 131 and switching the connections of the plurality of windings of the rotating machine 103.

The first protrusions and the second protrusions face to each other, and accordingly, the winding terminals U1 to U4 and the semi-moving element short-circuit part 131 mechanically come in contact with each other.

Furthermore, when an opposed state of the first protrusions and the second protrusions is changed to a non-opposed state, the winding terminals U1 to U4 and the semi-moving element short-circuit part 131 that have been in a mechanical contact state will enter a non-contact state.

Furthermore, the moving element 140 slides relative to the semi-moving element 130 while the first protrusions and the second protrusions come in contact with each other in a non-opposed state.

So far, description has been given about the problems with conventional technologies, their solutions, and the principle of reducing the size of the winding switching device and increasing its service life, which is an objective of the present invention. FIG. 4 shows the comparison of advantages and disadvantages between the present invention and conventional technologies. As shown in FIG. 4, according to the present invention (this example), it is possible to provide a winding switching device having a great pressing force at the contact portion, low electrical resistance, a long mechanical life, and small actuator power. As a result, it is possible to contribute to the reduction of size and cost and the achievement of high reliability (long life) of a rotating machine drive system and a vehicle provided with the winding switching device.

Moreover, by constructing the rotating machine drive system according to this example as being an integrated traction motor system wherein a rotating machine 103, an inverter device 101, and a winding switching device 120 are integrated into one unit, it is possible to eliminate or shorten the wiring between devices. Consequently, the rotating machine drive system can be small and the reliability increases.

Example 2

Figure 5B:
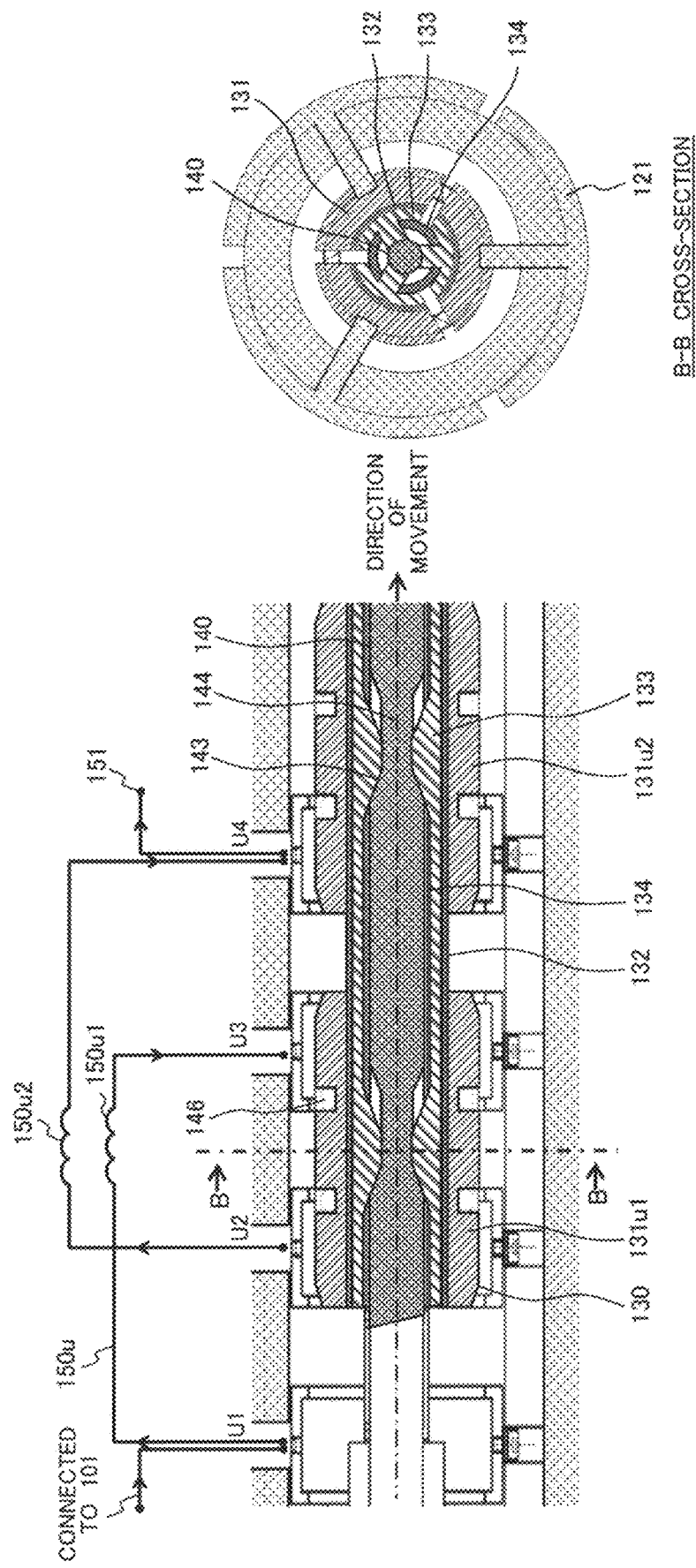
FIG. 5B shows the operation of the 1Y/2Y switching device for one phase according to example 2 of the present invention.

A second example of the present invention will be described with reference to FIG. 5A and FIG. 5B. FIG. 5A and FIG. 5B show the operation of the 1Y/2Y switching device for one phase according to example 2.

FIG. 5A and FIG. 5B show the detailed structure shown in FIG. 3. Specifically, the semi-moving element 130 comprises a short-circuit part 131 (131$u$1, 131$u$2), an insulating part 132, a sliding part 133, a guide 134, and a coil spring 136. The coil spring 136 expands and contracts in a circumferential direction and is stored in an annular groove provided in the outer periphery of the short-circuit part 131. With this structure, a contraction force is applied to the short-circuit part 131 in an inner periphery direction.

However, as shown in the drawing on the right in FIG. 5A, the short-circuit part 131 is divided into three portions in a circumferential direction, integrated with the insulating part 132 and the sliding part 133 into one structure, and the integrated part is supported by a guide 134. The number of divisions in a circumferential direction is not limited to three, and it may be two or four or more as long as the short-circuit part 131 can expand and contract in a radial direction. The moving element 140 is composed of a rod 144 provided with a sliding part 143.

As shown in FIG. 5A, starting end U1 and starting end U2, and end U3 and end U4 of the U-phase winding 150$u$ are connected in parallel by short-circuit parts 131$u$1 and 131$u$2, respectively, thereby establishing a 2Y-connection. When the inclined surface of the protrusions of the semi-moving element sliding part 133 faces the inclined surface of the protrusions of the moving element sliding part 143, a pressing force between the winding terminals U1 to U4 and the short-circuit part 131 (131$u$1, 131$u$2) is generated outward in a radial direction from the inner periphery side to the outer periphery side relative to the short-circuit part 131.

Then, as shown in FIG. 5B, during switching, the moving element 140 slides in the X direction, eliminating the opposed state of the protrusions of the semi-moving element sliding part 133 and the protrusions of the moving element sliding part 143, and the semi-moving element 130 contracts in an inner periphery direction by a contraction force of the coil spring 136.

This movement eliminates the mechanical contact between the winding terminals U1 to U4 and the short-circuit part 131. When the moving element 140 further slides in the X direction, as shown in FIG. 5B, the semi-moving element 130 slides in the X direction along with the moving element 140 while the side surface of the protrusions of the semi-moving element sliding part 133 and the side surface of the protrusions of the moving element sliding part 143 come in contact with each other. Subsequent operations are the same as those shown in FIG. 3.

As stated above, in the winding switching device 120 according to this example, the semi-moving element short-circuit part 131 is divided in a circumferential direction, and the semi-moving element 130 is biased by a coil spring 136 in a radial direction of the moving element 140.

The above-mentioned structure eliminates the sliding between the winding terminals U1 to U4 and the short-circuit part 131. Accordingly, wear of both the winding terminals and the short-circuit part due to repeated switching operation can be avoided, resulting in a long mechanical life. Furthermore, since sliding friction is generated only at the contact portion between the semi-moving element sliding part 133 and the moving element sliding part 143, by making the sliding part composed of material having a small friction coefficient, it is possible to achieve both the X-direction movement of the moving element 140 and the Z-direction movement of the semi-moving element even with small actuator power. As a result, it is possible to simultaneously achieve a small winding switching device and its long life.

Furthermore, when the protrusions of the semi-moving element sliding part 133 and the protrusions of the moving element sliding part 143 face to each other, a sufficient pressing force can be generated between the winding terminals U1 to U4 and the short-circuit part 131. Thus, it is possible to suppress electrical resistance at the contact portion while avoiding the decrease in life due to sliding friction. Furthermore, since the semi-moving element 130 and the moving element 140 are made of simple cylindrical parts, unlike the link mechanism, increase of the number of parts or the size can be avoided. Thus, it is possible to provide a small winding switching device even in applications where large current will flow.

Example 3

Figure 6A:
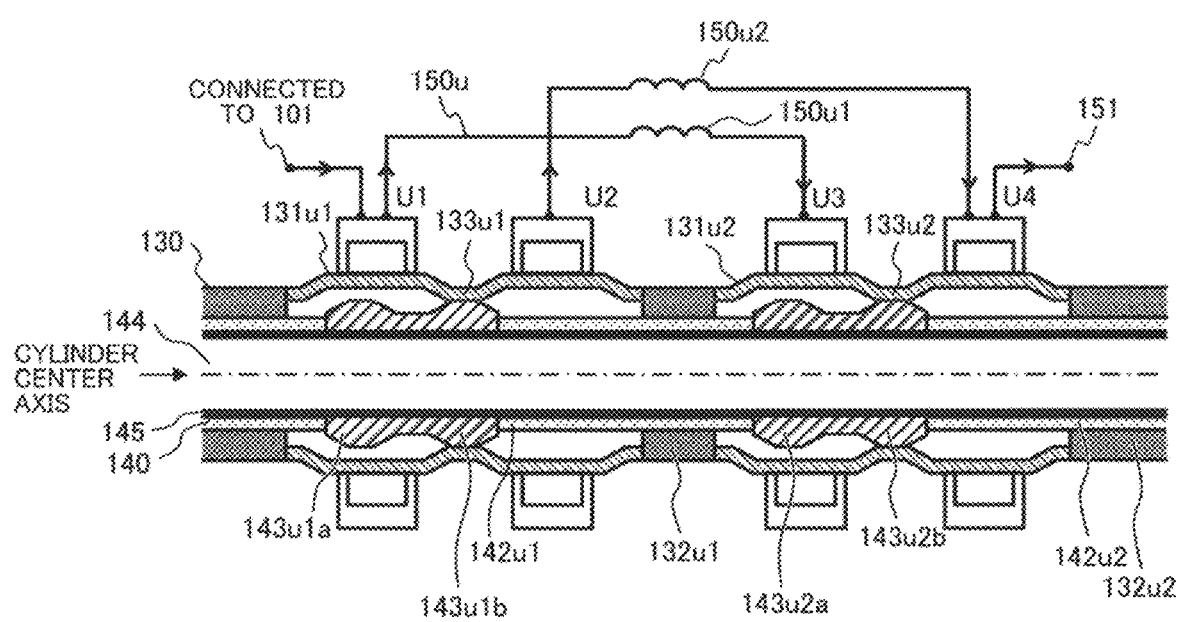
FIG. 6A shows the operation of the 1Y/2Y switching device for one phase according to example 3 of the present invention.
Figure 6B:
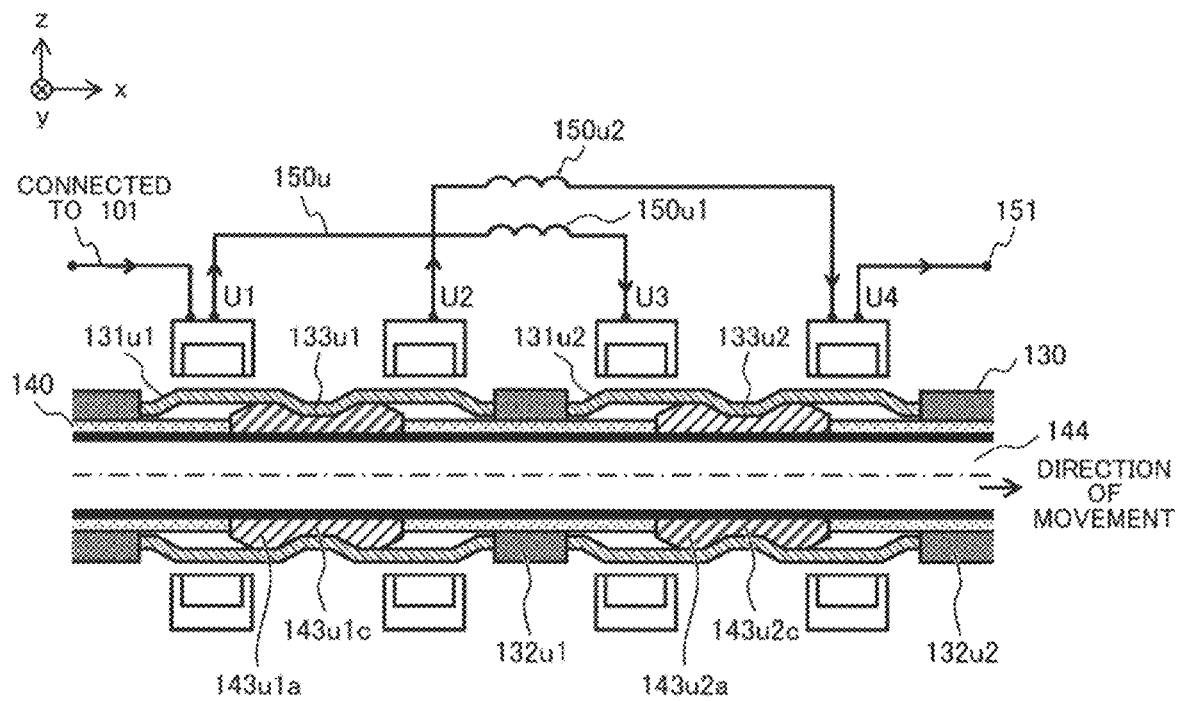
FIG. 6B shows the operation of the 1Y/2Y switching device for one phase according to example 3 of the present invention.
Figure 6C:
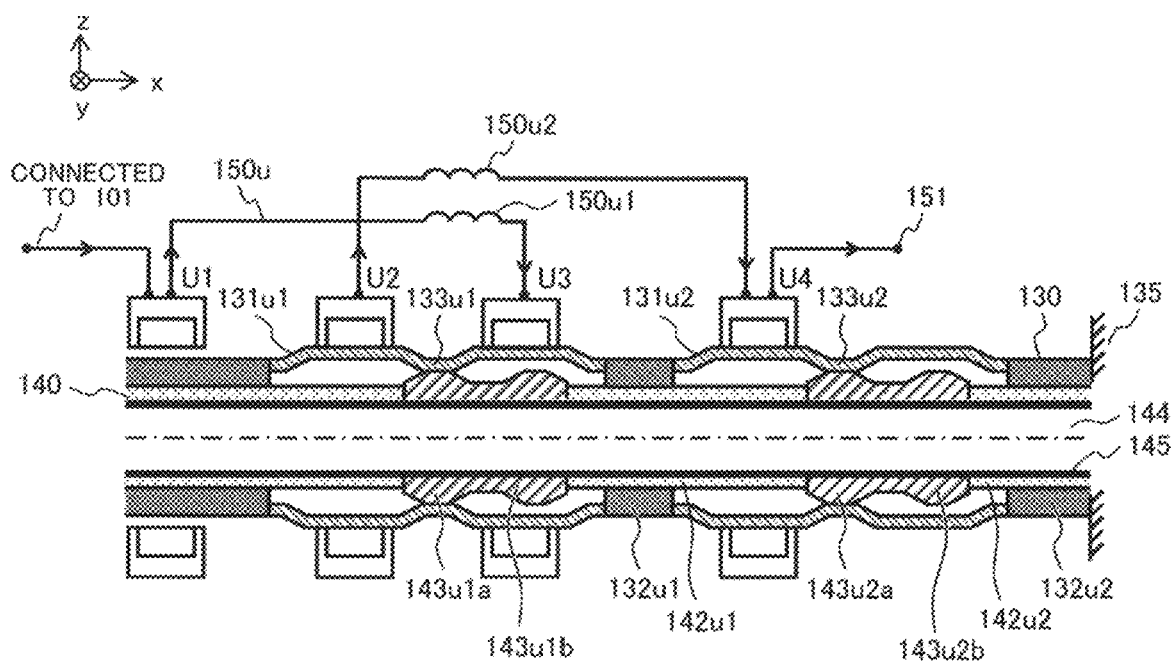
FIG. 6C shows the operation of the 1Y/2Y switching device for one phase according to example 3 of the present invention.
Figure 8:
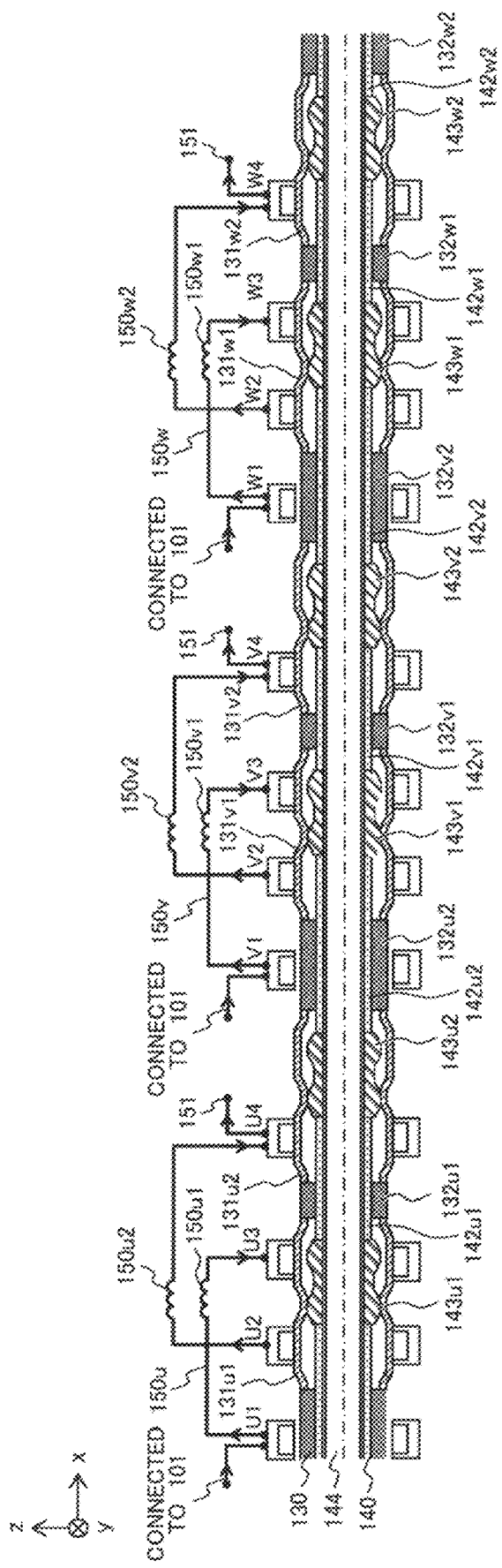
FIG. 8 shows the structure of the 1Y/2Y switching device for three phases according to example 3 of the present invention.

A third example of the present invention will be described with reference to FIG. 6A through FIG. 8. FIG. 6A through FIG. 6C show the operation of the 1Y/2Y switching device for one phase according to example 3. FIG. 7 shows the semi-moving element and the moving element of the 1Y/2Y switching device according to example 3. FIG. 8 shows the operation of the 1Y/2Y switching device for three phases according to example 3.

The winding switching device of this example is different from the winding switching device of example 1 (FIG. 3) in the point that the semi-moving element short-circuit part 131 and the semi-moving element sliding part 133 are integrated into one metal part.

More specifically, the semi-moving element 130 comprises a short-circuit part 131$u$1 (also serves as a sliding part 133$u$1), a short-circuit part 131$u$2 (also serves as a sliding part 133$u$2), an insulating part 132$u$1, and an insulating part 132$u$2. The moving element 140 comprises sliding parts 143$u$1$a$ and 143$u$1$b$, sliding parts 143$u$2$a$ and 143$u$2$b$, an insulating part 142$u$1, an insulating part 142$u$2, a moving element rod 144, and a rod insulating part 145.

As shown in FIG. 7($a$), the semi-moving element short-circuit part 131 is cylindrical and comprises a leaf spring 131$a$, slits 131$b$, and a sliding part 133 dented to the inner periphery side. By arranging a plurality of slits 131$b$ in a circumferential direction of the cylinder, a plurality of leaf springs 131$a$ arranged in a circumferential direction of the cylinder are capable of moving in a radial direction. Accordingly, by providing the sliding part 133$a$ with a force to expand outward in a radial direction from the inner periphery side to the outer periphery side, the leaf springs 131a expand outward in a radial direction. On the other hand, by removing from the sliding part 133 the force to expand outward in a radial direction, the leaf springs 131a contract inward in a radial direction due to resilience.

As shown in FIG. 7(b), the moving element 140 comprises a sliding part 143, an insulating part 142, a moving element rod 144, and a rod insulating part 145. The moving element sliding part 143 is cylindrical and comprises portions 143a and 143b protruding in the Z direction and a portion 143c dented in the Z direction.

That is, the semi-moving element short-circuit part 131 comprises at least two cylindrical conductors for each phase, and a cylindrical non-conductive member (insulating part 132) is disposed between the adjacent cylindrical conductors.

The above-mentioned structure makes it possible to achieve a small winding switching device with a long life by use of simple parts. Specific operation principle will be explained in detail below.

As shown in FIG. 6A, starting end U1 and starting end U2, and end U3 and end U4 of the U-phase winding 150u are connected in parallel by semi-moving element short-circuit parts 131u1 and 131u2, respectively, thereby establishing a 2Y-connection. At this time, the semi-moving element sliding parts 133u1 and 133u2 and the moving element sliding parts 143u1b and 143u2b face to each other.

Then, as shown in FIG. 6B, during switching, the moving element 140 slides in the X direction, releasing the opposed state of the semi-moving element sliding parts 133u1 and 133u2 and the moving element sliding parts 143u1b and 143u2b, and the semi-moving element 130 slides in the Z direction.

This movement eliminates the mechanical contact between the winding terminals U1 to U4 and the short-circuit part 131. When the moving element 140 further slides in the X direction, as shown in FIG. 6B, the semi-moving element 130 slides in the X direction along with the moving element 140 while the semi-moving element sliding parts 133u1 and 133u2 and the moving element sliding parts 143u1c and 143u2c come in contact with each other.

As shown in FIG. 6C, when the semi-moving element 130 reaches the stopper 135, only the moving element 140 keeps sliding in the X direction and stops at the time the semi-moving element sliding parts 133u1 and 133u2 and the moving element sliding parts 143u1a and 143u2a face to each other. By this movement, end U3 of the U-phase winding 150u1 and starting end U2 of the U-phase winding 150u2 are connected in serial by the short-circuit part 131u1, thereby establishing a 1Y-connection.

The above-mentioned structure eliminates the sliding between the winding terminals U1 to U4 and the short-circuit part 131. Accordingly, wear of both the winding terminals and the short-circuit part due to repeated switching operation can be avoided, resulting in a long mechanical life. Furthermore, since sliding friction is generated only at the contact portion between the semi-moving element sliding part 133 and the moving element sliding part 143, by making the sliding part composed of material having a small friction coefficient, it is possible to achieve both the X-direction movement of the moving element 140 and the Z-direction movement of the semi-moving element even with small actuator power. As a result, it is possible to simultaneously achieve a small winding switching device and its long life.

Furthermore, when the semi-moving element sliding part 133 and the moving element sliding part 143 face to each other, a sufficient pressing force can be generated between the winding terminals U1 to U4 and the short-circuit part 131. Thus, it is possible to suppress electrical resistance at the contact portion while avoiding the decrease in life due to sliding friction. Furthermore, since the semi-moving element 130 and the moving element 140 are made of simple cylindrical parts, unlike the link mechanism, increase of the number of parts or the size can be avoided. Thus, it is possible to provide a small winding switching device even in applications where large current will flow.

The semi-moving element short-circuit parts 131u1 and 131u2 need to be electrically insulated from each other, and in FIG. 6A through FIG. 6C, insulating parts 132u1 and 132u2 are disposed therebetween in the X direction. Material for the moving element sliding part 143 may be metal or resin, but metal is more desirable in terms of ensuring long-time durability. However, when using metal for making a moving element sliding part 143, moving element insulating parts 142u1 and 142u2 need to be provided so that electrical short-circuits will not occur between the semi-moving element short-circuit parts 131u1 and 131u2 via the moving element sliding part 143.

The moving element insulating part 142 may be composed of a cylindrical collar, or a sheet-like insulator wrapping around the moving element rod 144. When the moving element rod 144 is made of metal, a moving element rod insulating part 145 needs to be provided so as to avoid electrical short-circuits between the semi-moving element short-circuit parts 131u1 and 131u2 via the moving element rod 144.

When the moving element sliding part 143 is made of non-conductive material such as resin, a moving element insulating part 142 and a moving element rod insulating part 145 do not necessarily have to be provided.

It is preferable that a lubricant be applied to the portion where the semi-moving element sliding part 133 and the moving element sliding part 143 mechanically come into contact with each other or be filled into a space between both sliding parts so as to reduce the friction coefficient during sliding. By doing so, actuator power can be small, resulting in achieving a further smaller winding switching device.

When using a grease as a lubrication agent, grease will adsorb abrasion powder generated at the sliding parts, so it is possible to avoid problems of a scuff at the sliding parts or electrical short-circuits caused by abrasion powder scattering in the terminals.

Thus, according to the present invention, it is possible to separate the electrical short-circuit function from the mechanically sliding function on the outer periphery side and the inner periphery side of the semi-moving element 130. As a result, taking measures for achieving a long life becomes easier.

The moving element rod 144 may be driven by a direct acting type linear actuator or by a drive mechanism using ball screws. Also applicable is a structure where the moving element sliding part 143 is a helical structure swirling around the X-axis, the semi-moving element sliding part 133 is also a helical structure swirling around the X-axis, and the moving element rod 144 is rotated by a rotary actuator, thereby changing the opposed state of both sliding parts as shown in FIG. 6A through FIG. 6C.

FIG. 8 shows the overall structure of the switching device for three phases using the winding switching device according to this example (FIG. 6C). The structure for each phase is the same as those in FIG. 6A through FIG. 6C and detailed description is omitted. In FIG. 8, a 1Y-connection is established.

As shown in FIG. 8, the length in the X-direction of the semi-moving element insulating part 132u2 is greater than the length in the X-direction of the insulating part 132u1 so that the V-phase semi-moving element short-circuit part 131v1 does not interfere with terminal U4 during the 1Y-connection. By integrating the moving element rod 144 for three phases into one structure, the number of parts can be made smaller.

Example 4

Figure 9:
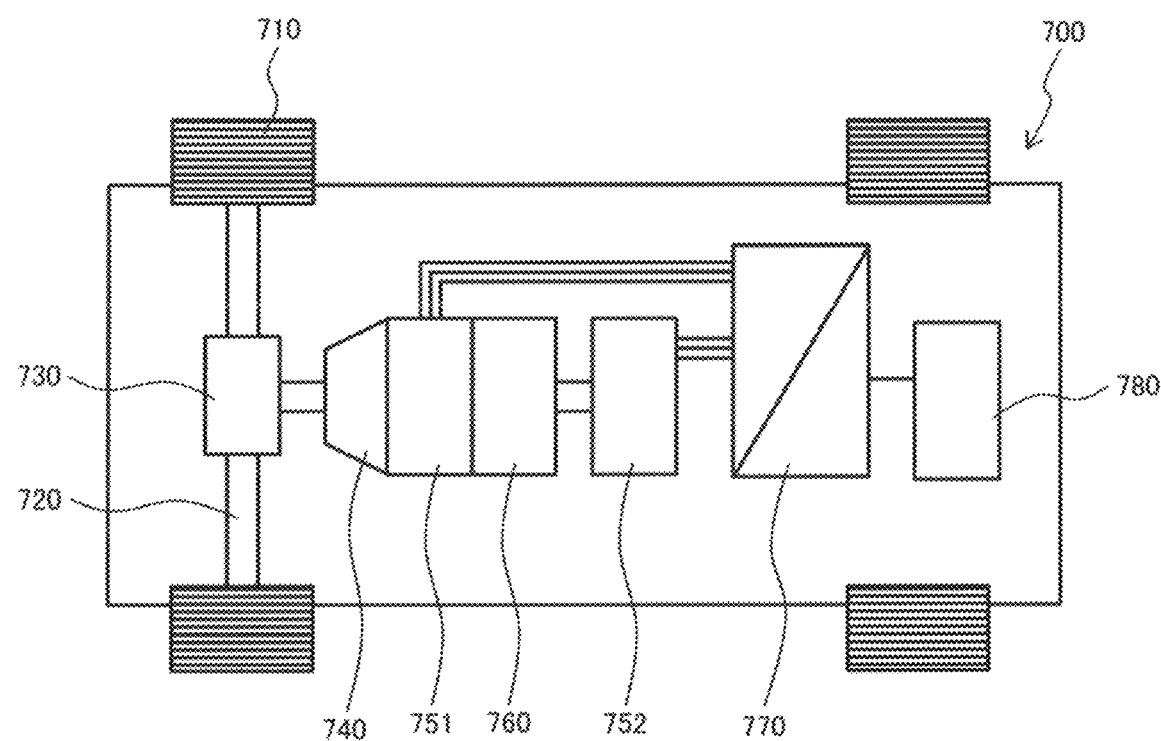
FIG. 9 shows a vehicle according to example 4 of the present invention.

A fourth example of the present invention will be described with reference to FIG. 9. FIG. 9 shows a vehicle provided with a rotating machine drive system having any one of winding switching devices according to example 1 through example 3.

The present invention applies to rotating electrical machines 751 and 752 shown in FIG. 9. As shown in FIG. 9, the vehicle 700 refers to a hybrid automobile or a plug-in hybrid automobile for example, and is provided with an engine 760, rotating electrical machines 751 and 752 and a battery 780.

When driving the rotating electrical machines 751 and 752, the battery 780 supplies direct-current power to a power conversion device 770 (inverter device) for drive. The power conversion device 770 converts the direct-current power from the battery 780 to alternating-current power and supplies the alternating-current power to the rotating electrical machines 751 and 752.

Furthermore, during regeneration traveling, the rotating electrical machines 751 and 752 generate alternating-current power according to kinetic energy of the vehicle 700 and supplies the alternating-current power to the power conversion device 770. The power conversion device 770 converts the alternating-current power from the rotating electrical machines 751 and 752 to direct-current power and supplies the direct-current power to the battery 780.

Rotation torque generated by the engine 760 and the rotating electrical machines 751 and 752 is transmitted to wheels 710 via a transmission 740, a differential gear 730, and an axle shaft 720.

Generally, a wide driving range, such as low-speed high-torque for hill start, high-speed low-torque for driving on the highway, medium-speed medium-torque for driving in town, etc., is needed for automobiles. In such a wide driving range, the rotating electrical machines 751 and 752 provided with a rotating machine drive system having a winding switching device according to the present invention make highly efficient driving possible.

In addition, heat loss is reduced, making it possible to increase the safety of the vehicle 700 and achieving a long life. Furthermore, it becomes possible to increase the cruising distance of the vehicle 700. Moreover, in an electrical automobile driven only by the power of the rotating electrical machines without having an engine 760, by applying a rotating electrical machine according to the present invention, the same advantageous effects can be ensured.

Moreover, the present invention is not limited to the above-mentioned examples and various modifications are included. For example, the above-mentioned examples were described in detail to facilitate the understanding of the present invention, and the present invention is not limited to an embodiment that comprises all of the structures. Furthermore, it is possible to replace a part of the structure according to one example with a structure according to another example. It is also possible to add a structure of one example to a structure of another example. Furthermore, addition, deletion, or replacement is possible to a part of the structure of each example from other structures.

REFERENCE SIGNS LIST

101: Inverter device, 102: direct-current power source, 103: rotating machine, 104: inverter circuit, 105: control device, 106: phase current detection circuit, 106A: phase current information, 107: inverter main circuit, 108: inverter control part, 108A: applied voltage command pulse signal, 109: gate driver, 110: winding switching command part, 120: winding switching device, 121: winding switching device chassis, 130: semi-moving element, 131a: leaf spring, 131b: slit, 131: (semi-moving element) short-circuit part, 132: (semi-moving element) insulating part, 133: (semi-moving element) sliding part, 134: (semi-moving element) guide, 135: (semi-moving element) stopper, 136: coil spring, 140: moving element, 141: (moving element) short-circuit part, 142: (moving element) insulating part, 143: (moving element) sliding part, 144: (moving element) rod, 145: (moving element) rod insulating part, 150: winding, 151: neutral point, 700: vehicle, 710: wheel, 720: axle shaft, 730: differential gear, 740: transmission, 751, 752: rotating electrical machine, 760: engine, 770: power conversion device, 780: battery.

The invention claimed is:

1. A rotating machine drive system, comprising
a rotating machine having a plurality of windings,
an inverter device for operating said rotating machine at variable speed, and
a winding switching device for switching connections of the plurality of windings, said winding switching device having
winding terminals,
a semi-moving element having a short-circuit part facing said winding terminals and also having a sliding part provided with first protrusions on the surface opposite from the surface having said short-circuit part, and
a moving element facing the sliding part of said semi-moving element and having a sliding part provided with second protrusions on the surface facing the sliding part of said semi-moving element, said moving element being made to slide relative to said semi-moving element so as to change the connection between said winding terminals and said short-circuit part and switch the connections of the plurality of windings.

2. The rotating machine drive system according to claim 1, wherein
said first protrusions and said second protrusions face to each other so that said winding terminals mechanically come in contact with said short-circuit part.

3. The rotating machine drive system according to claim 2, wherein
said winding terminals and said short-circuit part make a transition from a mechanical contact state to a non-contact state when an opposed state of said first protrusions and said second protrusions is changed to a non-opposed state.

4. The rotating machine drive system according to claim 3, wherein
said moving element slides while said first protrusions and said second protrusions come in contact with each other in a non-opposed state.

5. The rotating machine drive system according to claim 1, wherein
said short-circuit part comprises at least two cylindrical conductors, and a cylindrical non-conductive member is disposed between the cylindrical conductors adjacent to each other.

6. The rotating machine drive system according to claim 1, wherein
a lubricant is applied to the sliding part of said semi-moving element or filled into a space between the sliding part of said semi-moving element and the sliding part of said moving element.

7. The rotating machine drive system according to claim 6, wherein
an interval between the sliding part of said semi-moving element and the sliding part of said moving element is sealed.

8. The rotating machine drive system according to claim 1, wherein
said moving element is driven by a direct acting type linear actuator or a ball screw mechanism.

9. The rotating machine drive system according to claim 1, wherein
said short-circuit part and the sliding part of said semi-moving element are integrated into one metal part.

10. The rotating machine drive system according to claim 1, wherein
said short-circuit part is divided in a circumferential direction, and said semi-moving element is biased by a spring in the direction of said moving element.

11. The rotating machine drive system according to claim 1, wherein
said rotating machine, said inverter device, and said winding switching device are integrated into one unit constructing an integrated traction motor system.

12. A vehicle comprising
a rotating electrical machine,
a battery, and
a power conversion device for converting direct-current power from said battery to alternating-current power and supplying the alternating-current power to said rotating electrical machine, wherein
torque of said rotating electrical machine is transmitted to wheels via a transmission, and said rotating electrical machine is provided with a rotating machine drive system according to claim 1.

* * * * *